(12) United States Patent
Johnson et al.

(10) Patent No.: US 11,422,068 B2
(45) Date of Patent: *Aug. 23, 2022

(54) PROCESS INSERTS, ASSEMBLIES, AND RELATED METHODS FOR HIGH VELOCITY APPLICATIONS

(71) Applicant: JMS Southeast, Inc., Statesville, NC (US)

(72) Inventors: Mitchell Johnson, Statesville, NC (US); Srinivasan Iyer, Statesville, NC (US); Brad Murphy, Statesville, NC (US)

(73) Assignee: JMS Southeast, Inc, Statesville, NC (US)

( * ) Notice: Subject to any disclaimer, the term of this patent is extended or adjusted under 35 U.S.C. 154(b) by 325 days.

This patent is subject to a terminal disclaimer.

(21) Appl. No.: 16/614,993

(22) PCT Filed: May 21, 2018

(86) PCT No.: PCT/US2018/033697
§ 371 (c)(1),
(2) Date: Nov. 19, 2019

(87) PCT Pub. No.: WO2018/217644
PCT Pub. Date: Nov. 29, 2018

(65) Prior Publication Data
US 2020/0182710 A1    Jun. 11, 2020

Related U.S. Application Data

(60) Provisional application No. 62/542,015, filed on Aug. 7, 2017, provisional application No. 62/509,120, filed on May 21, 2017.

(51) Int. Cl.
*G01N 1/20* (2006.01)
*G01K 13/02* (2021.01)
(Continued)

(52) U.S. Cl.
CPC .............. *G01N 1/20* (2013.01); *B05B 1/22* (2013.01); *G01F 1/684* (2013.01); *G01F 15/18* (2013.01);
(Continued)

(58) Field of Classification Search
CPC ............... G01N 1/20; G01N 1/2035; G01N 2001/2071; B05B 1/22; G01F 1/684;
(Continued)

(56) References Cited

U.S. PATENT DOCUMENTS 3,081,631 A  *  3/1963  Switzer, Jr. ............ G01K 13/02
                                                                    285/201
3,747,411 A  *  7/1973  McDermott ......... G01N 1/2035
                                                                    73/864.33

(Continued)

FOREIGN PATENT DOCUMENTS

KR        10-1598923 B1      3/2016

OTHER PUBLICATIONS

International Searching Authority, International Search Report, dated Aug. 24, 2018.
(Continued)

*Primary Examiner* — Nathaniel T Woodward
*Assistant Examiner* — Philip L Cotey
(74) *Attorney, Agent, or Firm* — Bryan L. Baysinger; E. Eric Mills; Nexsen Pruet, PLLC (57) ABSTRACT

Process inserts, assemblies, and related methods for use in monitoring high velocity fluids or supporting instruments that monitor and manage high velocity fluids are disclosed. Exemplary inserts include a head having a cavity for receiving an instrument, a shank, and an integral flange. The shank includes an elongated body having a first end disposed proximate to the head, a free end opposite the first end, and a threaded portion spaced apart from the first and free ends.
(Continued)

Exemplary process insert assemblies include a process insert having a shank and a threaded support disposed around the shank. Methods of making and using process inserts are also disclosed. For example, a method of installing a process insert on a container includes inserting the free end of the process insert in the interior volume of a container containing a high velocity fluid.

21 Claims, 6 Drawing Sheets

(51) Int. Cl.
    *G01K 1/14*     (2021.01)
    *G01K 1/08*     (2021.01)
    *G01F 1/684*     (2006.01)
    *G01F 15/18*     (2006.01)
    *B05B 1/22*     (2006.01)

(52) U.S. Cl.
    CPC ............ *G01K 1/08* (2013.01); *G01K 1/14* (2013.01); *G01K 13/02* (2013.01); *G01N 1/2035* (2013.01); *G01N 2001/2071* (2013.01)

(58) Field of Classification Search
    CPC . G01F 15/18; G01K 1/08; G01K 1/14; G01K 13/02
    See application file for complete search history.

(56) References Cited

U.S. PATENT DOCUMENTS

| | | | | |
|---|---|---|---|---|
| 4,331,170 A * | 5/1982 | Wendell | ............ | F16L 41/04 408/100 |
| 4,631,967 A * | 12/1986 | Welker | ............ | G01L 19/0007 73/866.5 |
| 4,877,271 A * | 10/1989 | McCorkle | ............ | F16L 19/005 285/382.7 |
| 5,674,055 A * | 10/1997 | Nimberger | ............ | F04B 53/143 417/313 |
| 6,599,012 B2 * | 7/2003 | Gul | ............ | G01K 1/08 374/208 |
| 7,465,086 B1 * | 12/2008 | Foreman, Jr. | ............ | G01K 1/08 73/866.5 |
| 8,770,837 B2 * | 7/2014 | Egan | ............ | G01K 1/08 374/208 |
| 2003/0110870 A1 * | 6/2003 | Bigalke | ............ | G01N 1/2035 73/863.85 |
| 2004/0101025 A1 * | 5/2004 | Welker | ............ | G01K 1/146 374/E13.006 |
| 2008/0038057 A1 * | 2/2008 | Stadler | ............ | E01F 13/046 404/9 |
| 2008/0141769 A1 * | 6/2008 | Schmidt | ............ | G01K 17/12 374/E17.01 |
| 2011/0084794 A1 * | 4/2011 | Zuchek | ............ | G01K 1/08 29/428 |
| 2011/0150034 A1 * | 6/2011 | Breimon | ............ | G01K 1/08 374/E1.018 |
| 2012/0201269 A1 * | 8/2012 | Mujumdar | ............ | G01K 1/16 29/527.1 |
| 2013/0142216 A1 * | 6/2013 | Kleven | ............ | G01K 1/08 374/208 |
| 2015/0136842 A1 * | 5/2015 | Allen | ............ | G01F 1/667 228/219 |
| 2016/0025575 A1 * | 1/2016 | Schork | ............ | G01K 1/14 374/208 |
| 2016/0263537 A1 * | 9/2016 | Kenreck, Jr. | ............ | B01F 25/3133 |
| 2017/0131150 A1 * | 5/2017 | Thies | ............ | G01K 1/08 |
| 2019/0113420 A1 * | 4/2019 | Johnson | ............ | G01N 1/20 |

OTHER PUBLICATIONS

International Search Report, Application No. PCT/US18/33697, dated Aug. 24, 2018.
International Search Report, Application No. PCT/US2017/060871, dated Mar. 8, 2018.

\* cited by examiner

PROCESS INSERTS, ASSEMBLIES, AND RELATED METHODS FOR HIGH VELOCITY APPLICATIONS

CROSS-REFERENCE TO RELATED APPLICATIONS

This application is a national stage filing of PCT Application No. PCT/US2018/033697 filed on May 21, 2018, which claims priority pursuant to 35 U.S.C. § 119(e) to U.S. Provisional Patent Application Ser. No. 62/509,120, filed on May 21, 2017, and to U.S. Provisional Patent Application Ser. Nos. 62/542,015, filed on Aug. 7, 2017, each of which is hereby incorporated by reference in its entirety.

FIELD

This application relates to process inserts and assemblies and, more particularly, to process inserts and assemblies for high velocity fluids and methods making and using the same.

BACKGROUND

Process inserts are used to house and support various instruments that monitor, inject, and/or sample process fluids being sealed or contained in a container. Exemplary process fluids include, without limitation, high velocity gases or liquids that pass through one or more pipes, ducts, or vessels. Instruments, such as sensors or probes, can be housed in the process inserts and inserted within the container directly in the stream of the high velocity fluid for various applications. For example, the sensors or probes can be used to monitor the fluid via the extraction of fluid samples or obtain real-time temperature measurements of the fluid as it flows through the container.

In some instances, the process inserts vibrate in response to turbulence or vortices that form as a result of passing the high velocity fluid over and/or around the insert. Such vibrations can have adverse effects on the ability to obtain a dynamic fluid sample or accurate measurements using the instruments housed in the process inserts. Moreover, prolonged vibration of the process inserts can cause the inserts to oscillate, experience fatigue and/or cracking, detach from the container, and/or, in some instances, fail.

Accordingly, and in view of the problems described above, a need exists for improved process inserts and assemblies having an improved resistance to velocity induced vibration.

SUMMARY

Process inserts, assemblies, and related methods are set forth herein. Such inserts and assemblies can attach to containers having a high velocity fluid flowing therethrough, and be used to support or attach instruments that measure or sample the fluid, or instruments that inject material into the fluid. The process inserts, assemblies, and methods described herein advantageously support the formation of flanged and threaded connections that respectively seal the fluid in the container or insert and provide a point of support at the exterior surface of the fluid-containing container, which allows an unsupported length of the insert disposed within the container to be reduced. Reducing the unsupported length of the insert within the container improves the mechanical integrity of the insert and, thus, renders the insert less prone to damage caused by velocity induced vibration.

In some aspects, the process inserts described herein comprise a head having a cavity disposed therein for receiving an instrument. Such inserts further comprise a shank having an elongated body with a first end disposed adjacent or proximate to the head, a free end opposite the first end, and a threaded portion spaced apart from each of the first and free ends. The cavity can extend through a portion of the elongated body.

The threaded portion of the shank comprises a non-locking thread, such as a straight or non-tapered thread. The threaded portion may be located closer to the free end than the first end, or vice versa. In certain embodiments, the threaded portion is disposed on less than one-half of the elongated body. For example, approximately one-half of the elongated body can be disposed on a first side of the threaded portion and approximately one-quarter of the elongated body can be disposed on a second side of the threaded portion. Alternatively, the threaded portion may be disposed on more than one-half of the elongated body.

The process inserts described herein therefore can comprise a head having a cavity disposed therein for receiving an instrument, and a shank having a threaded portion spaced apart from each of the first and free ends. The process inserts can in some instances further comprise a flange configured to form a seal, such as a pressure containing seal. The seal can be formed between the process insert and a container to which the process insert can be attached. In some instances a plurality of flanges can form a seal between the process insert and a container. The flange or plurality of flanges can be any type of flange or have any flange design capable of forming a seal. For example, in some cases, a flange is or comprises a Van Stone-type flange, raised face flange, flat face flange, ring joint flange, or a tongue and groove flange. Additionally, when a plurality of flanges are used, such as a first flange and a second flange, the plurality of flanges are complementary in flange-type to each other. As understood by one of ordinary skill in the art, complementary flanges need not be the same type of flange, provided that the complementary flanges can be joined together to form a seal. Complementary flanges can be of the same type or different types. Moreover, one or more flanges of a process insert or system described herein can be used to form a seal in conjunction with one or more other components, such as a hub, washer, or o-ring.

In some embodiments, for example, process inserts described herein can comprise a hub disposed between the head and the shank of the insert, wherein the hub is configured to form a lap or lapped joint, such as with a flange member or plurality of flange members. The hub can extend radially outward from the process insert and have a diameter greater than a diameter of the head or shank.

Further, and in some embodiments, a first flange member is disposed on a first side of the hub and a second flange member is disposed on a second side of the hub, where the first side is a shank facing side and the second side is a head facing side of the hub. The first flange member or the second flange member can optionally comprise a Van Stone-type flange, raised face flange, flat face flange, ring joint flange, or a tongue and groove flange.

In some embodiments, the hub itself comprises or forms an integral flange, and a first flange member is disposed on a first side of the integral flange. The "integral" flange can be integrally formed from the process insert such that the integral flange is part of a unitary structure of the process insert (such as may be obtaining by forming the integral flange from the same material as the remainder of the process insert during manufacture of the process insert through a turning process). Alternatively, the "integral" flange can be a separately formed component that is attached or coupled to the process insert through welding, soldering, brazing, frictional engagement, threaded engagement, bonding, or any other type of joining process consistent with this disclosure.

Further, a plurality of bolts can be disposed through portions of a first flange member, second flange member, or integral flange described herein for forming a pressure containing seal that prevents the fluid from breaching the container and/or the insert. The pressure containing seal is a pressure rated seal, in certain embodiments.

Moreover, the elongated body of a process insert described herein can comprise a straight body, a stepped body, or a tapered body. For example, and in certain embodiments, the elongated body comprises a first body portion having a first diameter and a second body portion having a second diameter that is less than the first diameter. The threaded portion can be disposed on the first body portion or the second body portion. In certain embodiments, the first body portion abuts the second body portion, and the threaded portion is disposed adjacent to the where the first body portion meets the second body portion. The first and second body portions can be non-tapered or tapered.

The cavity formed in the head of the process inserts described herein can extend only partially through the shank or entirely through the shank. Various instruments can be fully or partially positioned and disposed in the cavity. For example, such instruments may include a sensor, probe, or sensor attaching device. Such sensors, where used, may include temperature sensors such as thermocouples, resistance temperature detectors (RTDs), bimetal Gauges, thermometers, or gas actuated thermometers. Other sensors and/or temperature sensors may be provided, including, without limitation, pressure sensors, leak detection sensors, velocity sensors, or any other type of sensor not inconsistent with the present disclosure.

In certain embodiments, the process inserts set forth herein are thermowells, protection tubes, sampling probes, and/or injection quills. In some cases, the thermowell process inserts set forth herein have structures that comply with ASME standards, including ASME PTC 19.3 TW, and specifically ASME PTC 19.3 TW 2016. Alternatively, process inserts comprising thermowells having dimensions that do not fall within the scope of ASME PTC 19.3 TW are also contemplated.

The process inserts described herein can be attached or connected to a container which can comprise, without limitation, any one of a duct, a pipe, a vessel, a conduit, or a tank. Such containers include one or more outer walls that define or enclose an interior volume. A free end of the process insert shank can be positioned or disposed in the interior volume of the container, and the first end of the shank can be positioned or disposed outside of the interior volume of the container. In certain embodiments, the free end of the shank is disposed at a spatial position located a distance away from the outer wall, such that a majority of the shank is outside of the container. Alternatively, a majority of the shank could be disposed inside the container.

In certain embodiments, the process insert shanks described herein comprises a supported length disposed adjacent to the outer wall of the container and an unsupported length positioned in the interior volume of the containers. In certain embodiments, a ratio of the supported length to the unsupported length is greater than 1. Alternatively, the ratio of the supported length to the unsupported length is less than or equal to 1.

According to another aspect, process insert assemblies are disclosed. Such an assembly comprises a process insert and a support. The process insert can comprise a shank, and the support can be disposed around the shank. The support further comprises a threaded region that is configured to threadingly engage the shank.

The assemblies set forth herein can further comprise a nozzle disposed between the insert and the support. Fluid can be sealed in the nozzle via the flanged connection to prevent fluid from breaching the insert. The nozzle can also support a non-threaded portion of the shank. The nozzle can optionally be nested or partially housed in the support. Alternatively, the nozzle can abut the support. In certain embodiments, the nozzle is welded to the support. Alternatively, the nozzle can frictionally or threadingly engage the support.

Notably, the support and/or nozzle, alone or combined, engage and support the shank on or over the outer wall of the container to which the insert is attached. Supporting the shank on or over the outer wall of the container improves the mechanical integrity of the insert and allows the unsupported length to be reduced.

Furthermore, in some embodiments when the first flange member or the second flange member is a Van Stone flange, the nozzle can have a first end and an opposite support facing end. The first end of the nozzle can be rolled, bent, or turned outward to form a Van Stone-style face flange that is positioned, disposed, or sandwiched between the first and second flange members. The face flange of the nozzle can in some instances directly contact the first side of the hub on the process insert, or indirectly contact the first side of the hub through a washer or spacer. In embodiments where the first flange member and the integral flange form a pressure tight or pressure rated seal, the face flange of the nozzle can be positioned between the first flange member and the integral flange.

In some instances, when the nozzle is or comprises a raised face flange, flat face flange, ring joint flange, or a tongue and groove flange, a first flange member can be attached to a first end of the nozzle through welding, soldering, brazing, frictional engagement, threaded engagement, bonding, or any other type of joining process.

In further aspects, methods of installing process inserts and assemblies on a container are disclosed. Such a method comprises inserting the free end of the process insert in the interior volume of the container. The method can further comprise screwing the threaded portion of the insert into a threaded portion of the container or a threaded portion of a support attached to the container, thereby threadingly engaging the insert with the container and forming a threaded attachment between the insert and the container. The threaded attachment does not form a substantially pressure containing and/or a pressure rated seal between the interior volume of the container and the exterior of the container. Rather, in many cases, the flanged connection formed at the process insert hub forms the pressure containing and/or pressure rated seal.

The method of installing an insert can further comprise forming a flanged connection between the insert and the container proximate to the hub of the insert. The flanged connection forms a pressure containing and/or a pressure rated seal between the interior volume of the container and the exterior of the container.

In further embodiments, the method of installing the insert further comprises inserting an instrument in the cavity of the insert. Such instruments can comprise, without limitation, a probe, a sensor, or an attachment device, including but not limited to a temperature sensor, a sampling attachment instrument, or an injection attachment device.

In a further aspect, a method of measuring the temperature of a fluid flowing through a container is disclosed. The method comprises inserting the free end of the process insert into the interior volume of the container, the insert comprising a thermowell. The method can further comprise inserting a temperature sensor into the cavity of the thermowell and measuring the temperature of the fluid using the temperature sensor.

In a further aspect, a method of sampling a fluid flowing through a container is disclosed. The method comprises inserting the free end of a process insert into the interior volume of the container, the insert comprising a sampling probe. The method can further comprise extracting a fluid sample from the interior volume of the container through the cavity of the insert.

In yet a further aspect, a method of injecting material into a fluid flowing through a container is disclosed. The method comprises inserting the free end of a process insert into the interior volume of the container, the insert comprising an injection quill. The method can further comprise injecting material into the fluid flowing through the container through the cavity of the insert.

BRIEF DESCRIPTION OF THE DRAWINGS

The invention will now be described by way of example with reference to the accompany figures.

DETAILED DESCRIPTION

Embodiments described herein can be understood more readily by reference to the following detailed description, examples, and figures. The devices, assemblies, and methods described herein, however, are not limited to the specific embodiments presented in the detailed description, examples, and figures. It should be recognized that these embodiments are merely illustrative of the principles of the present subject matter. Numerous modifications and adaptations will be readily apparent to those of skill in the art without departing from the scope of the present subject matter.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

As used herein, the term "container" refers to any structure having an interior volume formed by or between one or more surfaces of the container. Exemplary containers include, without limitation, pipes, vessels, ducts, tanks, conduits, enclosures, or combinations thereof.

As used herein, the terms "fluid" and "process fluid" refer to any material or composition that is flowing through a container. Exemplary compositions are fully or partially solid-phase, liquid-phase, or gas-phase compositions, or compositions can be formed from a combination of any two or more solid, liquid, or gas phase constituents.

As used herein, the term "process insert" refers to a structure that is configured for full or partial insertion into a stream of a process fluid flowing through a container. Exemplary process inserts include, without limitation, sensor attaching devices, thermowells, protection tubes, sampling probes, and injection quills.

I. Process Inserts

In one aspect, process inserts are described and disclosed herein. The process inserts set forth herein are configured for insertion in a container containing a fluid that is flowing at a high velocity through an interior volume of the container. The process inserts have a structure that facilitates the formation of flanged, pressure containing seals that are spaced apart from the outer surface of the container for improved installation, inspection, replacement, or removal of the inserts and/or instruments housed therein.

The process inserts described herein also exhibit a more robust and improved structural integrity that is bolstered, in part, by the provision of a threaded portion having a threaded support surface being supported on or over the outer surface of the container. Such inserts are also operable to facilitate improved fluid sampling, injecting, or fluid monitoring via an insert having a shortened unsupported length positioned inside the container. Reducing the unsupported length of the insert inside the container improves its ability to withstand forces or vibrations generated by the high velocity fluid as it flows around the insert. Thus, the inserts described herein may be operable for longer lifetimes and/or require less maintenance. The process inserts described herein also improve the protection and support afforded to instruments being housed therein, so that the instruments can more efficiently monitor, sample, inject, or otherwise interact with the high velocity fluid flowing through a container.

Turning now to specific components of the process inserts described herein, such inserts can comprise, consist, or consist essentially of a head, and an elongated shank having a threaded portion disposed on or over the elongated body of the shank.

In some embodiments, the head comprises a cavity configured to receive an instrument and the shank comprises an elongated body having a first end disposed proximate to the head, a free end opposite the first end, and a threaded portion spaced apart from each of the first and free ends. In certain instances, for example, the cavity extends through portions of head and the shank. For example, and in some embodiments, the cavity only extends through a portion of the elongated body of the insert. Alternatively, the cavity can extend through the entire length of the elongated body so that the cavity is open at multiple ends of the insert for accommodating a variety of different instruments and/or fluid management applications. Various instruments, such as sensors or probes, can be positioned within or connected to the cavity for measuring, monitoring, sampling, injecting, or otherwise managing the fluid as it flows through the container.

The head of the process insert can comprise an upper body portion having an upper surface in which an opening of the cavity is defined. The head can further comprise a lower body portion or base located opposite from the upper portion. One or more outer walls of the head portion extend between and connect the upper surface and the base. The outer wall(s) are optionally formed, machined, or otherwise shaped so that the head can be engaged and manipulated via one or more tools during installation, repair, inspection, or removal of the insert, such tools comprising, for example and without limitation, grips, pincers, pliers, sockets, or wrenches.

In some embodiments, the process inserts comprise a hub disposed between the head and the shank. The hub is in some instances configured to form a lapped joint on or over one or more flange members that form a flanged connection to seal the process fluid inside the container and/or portions of the insert (e.g., in an optional insert nozzle), thus preventing the fluid from reaching the outside environment when the process insert is coupled to the container. In other instances, the hub defines, forms, or is configured to form an integral flange that connects with a flange member to form a flanged connection to seal the process fluid inside the container and/or portions of the insert when the process insert is coupled to the container.

The hub is located or disposed proximate to the base of the head. In some cases, the hub is disposed around the circumference or perimeter of the base. The hub can also be disposed around the circumference or perimeter of the shank, in some cases, where the head meets the shank. The base of the head may terminate at the hub and/or at the shank. For example, and in some cases, the head abuts the shank and is directly adjacent to the shank, while in other cases the head abuts the hub and is directly adjacent to the hub and indirectly adjacent to the shank. In certain cases, each of the head and the shank are adjacent to the hub and abut the hub, as the hub is disposed therebetween.

Moreover, and in some cases, for example, the hub extends radially outward from the outer surface of the process insert to form a skirt, seat, or ledge that is larger in diameter than each of the head and the shank. The hub is configured to overlap one or more flange members for forming a lapped joint. In some cases, the one or more flange members can fittingly engage or seat against the hub, for example, and on opposing sides of the hub. The flange members can seat directly against the hub, or a spacer, such as a washer, may be positioned between the hub and one or both flange members.

In some instances, the hub extends radially outward from the outer surface of the process insert to form an integrated or integral flange. In this instance, the integral flange has a diameter larger than instances where the hub forms a lapped joint between two flange members. Generally, the integral flange, when present, has a diameter corresponding in size to the flange member. The integral flange is configured to engagingly fit or seat against the flange member. The integral flange and the flange member can seat directly against each other in some cases, or, in other cases, a spacer or washer may be positioned between the integral flange and the flange member. The integral flange can comprise a plurality of fastener receiving holes distributed radially proximate to an outer circumferential edge, the particular locations of each fastener receiving hole corresponding to a complementary fastener receiving hole on the flange member to be fastened to the integral flange. The integral flange can be integrally formed form the process insert, or the integral flange can be connected to the process insert through welding, soldering, brazing, frictional engagement, threaded engagement, bonding, or any other type of joining process consistent with this disclosure.

When forming an overlapping joint, upon positioning the flange members against the hub, one or more bolts or other such fasteners can be inserted through the complementary fastener receiving holes to secure the flange members together to form a pressure containing seal. When the hub comprises, forms, or defines the integral flange, upon positioning the flange member against the integral flange, one or more bolts or other such fasteners can be inserted through the complementary fastener receiving holes to secure the flange member and integral flange together to form a pressure containing seal. The flange members can be, but do not have to be, Van Stone flange members. In some instances, the flange members are a raised face flange, flat face flange, ring joint flange, or a tongue and groove flange. Additionally, in some instances the hub can overlap portions of one or both flange members for supporting formation of the pressure containing seal between the interior and exterior of the container or insert, thereby preventing fluid from breaching the container, the insert, or both.

In certain embodiments, the pressure containing seal formed via the flange members positioned at the hub, or via the flange member connected to the integral flange, is a pressure rated seal that is approved for use at high temperatures and pressures. For example, certain flanges must be approved for use under high pressure and/or temperature conditions according to one or more widely recognized standards, such as the American National Standards Institute (ANSI) standards. Depending on the material the flange is made from, such as cast iron or forged steel, and the type of connection required to attach the flange to a pipe (e.g. via a welded or threaded connection), standard class ratings are determined that set forth pressure/temperature ratings, required bolt and nut dimensions, etc. In the oil and gas industry, for example, flanges are expected to withstand high pressures, and the ANSI standards provide consumers with an assurance that the product is approved for particular applications. Accordingly, and in certain embodiments, the flanged connections described herein are ANSI B16.5 pipe flanges that are rated from Class 150 through to Class 2500 which allow for hydrostatic test pressures ranging from 400 psi (2.76 MPa) up to just under 10,000 psi (68.95 MPa). It will be appreciated by persons skilled in the art, however, that not all flanges fall within the scope of the ANSI standards. Thus, some of the flanges described herein are configured to meet and comply with the ANSI standards and ratings, while other flanges fall outside of the scope of having to meet the ANSI standards and ratings.

The process insert shank can extend outwardly away from the hub and terminate at a remote, distal location relative to the hub. The total length of the shank, as measured from the first end (i.e., adjacent to the hub or head) to the free end (i.e., the terminal end), can comprise any suitable length not inconsistent with the present disclosure. For example, the total length of the process insert shank, in some instances, is between about 1 and 48 inches, or any subrange thereof (e.g., 4-8 in., 5-10 in., 6-12 in., etc.). Longer or shorter shanks are also contemplated. Other exemplary shank lengths are provided in Table 1 below.

TABLE 1

| Total Length of Shank, in inches (in.) |
| --- |
| >2 in. |
| >10 in. |
| >12 in. |
| >24 in. |
| 4-16 in. |
| 6-48 in. |

The process inserts shanks described herein comprise a threaded portion, defining a threaded support surface that is disposed on or over the elongated shank body. The threaded portion is spaced at least some distance apart from each of the first and free ends and, in some cases, is disposed over an intermediate portion of the elongated shank body that is disposed between and/or bounded by the first and free ends. For example, in certain cases the threaded portion is spaced at least 0.2 inches apart from each of the first and second free ends, or any distance greater than 0.2 inches not inconsistent with the instant disclosure (e.g., 0.5 in., 0.8 in., 1 in., 2 in., etc.). As noted above, the threaded portion can be spaced equal distances away from the first and free ends (i.e., a centrally disposed threaded portion) or unequal distances from the first and free ends (i.e., a non-centrally disposed threaded portion).

Further, and in some instances, a first portion of the shank is disposed on a first side of the threaded portion, between the first end of the shank and the initial thread of the threaded portion, the initial thread being the closest thread to the hub. A second portion of the shank can be disposed on a second side of the threaded portion, on the free end side of the body. In certain cases, the threaded portion is a non-locking thread, such as a straight or non-tapered thread. The threaded portion of the process insert is configured to threadingly engage a threaded support or a threaded region of the container to which the insert attaches for improved support and stability of the instrument disposed inside of the insert. The threaded portion provides a point of support on the insert, and is not necessarily configured to substantially seal the inside of the container from the outside of the container, or prevent fluid from breaching the container.

The threaded portion of the shank improves the stability and support of the insert via threaded engagement to a matching thread of the support or wall of the container, which allows for a reduction in the unsupported length of the shank. For example, portions of the shank disposed below the final thread of the threaded portion, the final thread being the most distal from the hub, including portions of the shank that extend between the final thread and the free end of the shank define the "unsupported length" of the shank and insert. The unsupported length of the shank is the portion of the insert that is inserted in the interior volume of the container and positioned in the path of the fluid. The remainder of the shank can be supported outside of the container.

In certain instances, the ratio of the supported length of the shank to the unsupported length of the shank for the process inserts described herein is greater than 1. Alternatively, the ratio of the supported length of the shank to the unsupported length of the shank can be less than 1. The unsupported length of the shank, in some cases, is between about 0.5 and 24 inches, or any subrange thereof (e.g., 1-6 in., 2-6 in., 4-8 in., etc.). However, the unsupported length of the shank can comprise any length not inconsistent with the present disclosure. Other exemplary lengths are provided in Table 2 below.

TABLE 2

| Unsupported Length of Shank, in inches (in.) |
| --- |
| >0.5 in. |
| >2 in. |
| >4 in. |
| >12 in. |
| 2-16 in. |
| 4-24 in. |

Still referring to the process insert shank, and in some cases, the threaded portion of the shank is located closer to the free end of the shank than the first end of the shank, such that the unsupported length is reduced. However, it may be desirable in other embodiments to position the threaded portion of the shank closer to the first end of the shank. Any placement of the threaded portion on, over, or relative to the elongated body of the shank, not inconsistent with the present application, is contemplated. For example, in certain embodiments, the thread is centrally located between the first end of the shank and the free end of the shank.

In an exemplary embodiment, approximately one-half of the elongated body is disposed on a first side of the threaded portion, approximately one-quarter of the elongated body is disposed on a second side of the threaded portion, and the thread extends over approximately one-quarter of the elongated body. However, the threaded portion can occupy any spatial location and length of the shank not inconsistent with the present disclosure. In another exemplary embodiment, approximately one-third of the elongated body is disposed on a first side of the threaded portion, approximately one-third of the elongated body is disposed on a second side of the threaded portion, and the thread extends over approximately one-third of the elongated body. The threaded portion can be disposed on less than one-half of the total length of the shank or more than one-half of the total length of the shank. Any length and location of the threaded portion over the shank, not inconsistent with the present disclosure, are contemplated.

The shank can further comprise any size of diameter not inconsistent with the present disclosure. For example, the shank can comprise a diameter of between about 0.25 and 6 inches, or any subrange thereof (e.g., 1-2 in., 1-6 in., 2-4 in., etc.). The shank diameter can be substantially uniform along its entire length. Alternatively, the shank diameter can vary along its entire length between the first end and the free end. For example, in certain cases, the first end comprises a larger diameter than the free end. In other embodiments, the threaded portion comprises a larger diameter than the first and free ends. In further embodiments, the shank, or any portion thereof, comprise a tapered diameter. The shank can comprise a substantially uniform diameter, a non-uniform (i.e., variable) diameter, or a tapered diameter, where desired. Where the diameter varies, it may optionally assume a stepped configuration, in which a larger diameter section abuts and/or forms a step against a smaller diameter section. Any shank shape or configuration not inconsistent with the present disclosure can be provided.

Referring now to the cavity being formed through the process insert, and in certain embodiments, the cavity is an elongated cavity that extends in an elongated direction along an elongated axis of the process insert. The elongated axis can bisect the insert in the longitudinal direction corresponding to the elongated length of the shank. One or more instruments, such as one or more sensors or probes, are then positioned in the cavity. The cavity can be centrally or non-centrally disposed through portions of the head and the shank. Other cavity shapes, such as non-elongated shapes area also contemplated. The cavity can comprise a substantially circular sectional shape, a non-circular sectional shape, or any other sectional shape not inconsistent with the present disclosure.

In some embodiments, for example, where the cavity does not extend the full length of the shank, the cavity can house or support a sensor. Exemplary sensors include, without limitation, pressure sensors, temperature sensors, velocity sensors, humidity sensors, leak sensors, or any other type of sensor not inconsistent with the present disclosure. In certain embodiments, the sensor disposed in the process insert cavity is a temperature sensor including, without limitation, a thermocouple, a resistance temperature detector (RTD), a bimetal Gauge, or a thermometer.

In further embodiments, for example, where the cavity does extend through the entire length of the shank, the cavity can be connected to a sampling instrument or injection device to function as a sampling probe or an injection quill. The cavity can include openings at the process insert head and free end for allowing the sampling probe or injection quill to respectively extract a fluid sample or inject a material into the fluid passing through the container. Any other type of probe or instrument not inconsistent with the present disclosure may be positioned within the insert cavity for interacting with and/or managing the flow of fluid through the container.

Notably, as described in reference to the hub, the process insert is configured to support and/or form a flange sealed or flanged connection proximate the process insert hub. In some instances the hub forms a lapping joint with one or more flange members to form a pressure containing seal that prevents the fluid from breaching the container or insert. In some embodiments with the overlapping joint, a first flange member is disposed on a first side of the hub and a second flange member disposed on a second side of the hub, where the first side is a shank facing side and the second side is a head facing side of the hub. Each flange member can abut or seat on, over, or against the hub, directly or indirectly. The flange members can optionally comprise a Van Stone-type flange, raised face flange, flat face flange, ring joint flange, or a tongue and groove flange. One or more fasteners (e.g., screws, clips, or bolts) can be positioned through the fastener receiving holes of the flange members and compressively draw the flange members towards and against each other to form a pressure containing seal. The pressure containing seal can prevent fluid from breaching the container as well as an optional nozzle that surrounds portions of the insert. The first flange member can be optionally attached to an end of the nozzle by welding, soldering, brazing, frictional engagement, threaded engagement, bonding, or any other type of joining process consistent with this disclosure.

In some instances, the hub itself forms the integral flange and contacts the flange member to form a pressure containing seal that prevents the fluid from breaching the container or insert. In the embodiments with the integral flange, a first flange member is disposed on a first side of the integral flange, and the first flange member abuts or seats on, over, or against the first side of the integral flange, either directly or indirectly. For purposes of orientation, the first side is a shank facing side and the second side is a head facing side of the integral flange. As described for the overlapping joint embodiment, the first flange member can optionally be a Van Stone-type flange, raised face flange, flat face flange, ring joint flange, or a tongue and groove flange, and one or more fasteners can compressively draw the flange member and the integral flange together to from a pressure containing seal. In some preferred embodiments, the first flange member is a raised face flange. Moreover, the first flange member can optionally be connected to the nozzle via welding, soldering, brazing, frictional engagement, threaded engagement, bonding, or any other type of joining process consistent with this disclosure.

The inserts described herein can comprise any type of insert not inconsistent with this disclosure. Such inserts house, support, or attach instruments configured to test, inject, sample, monitor, or manage the high velocity fluid passing through a container. In some embodiments, the process insert is a sensor attaching device that facilitates support and attachment of one or more sensors to the container. In other embodiments, the process insert is a thermowell having an overall structure that complies with ASME PTC 19.3 TW 2016 standard. In further embodiments, the process insert is a protection tube, a sampling probe, an injection quill, or a thermowell falling outside of the scope of ASME PTC 19.3 TW 2016 standard.

The process inserts described herein can be attached or connected to a container comprising an outer wall enclosing an interior volume. The free end of the process insert shank is positioned in the interior volume of the container and the first end of the shank is positioned outside of the interior volume and a distance away from the outer wall. Exemplary containers include, without limitation, pipes, vessels, ducts, conduits, or tanks.

The process inserts described herein can have any combination of properties or features described herein not inconsistent with the objectives of this disclosure. Numerous modifications and adaptations thereof will be readily apparent to those skilled in the art without departing from the scope of the subject matter.

II. Process Insert Assemblies

In a further aspect, process insert assemblies are disclosed. The assemblies described herein improve the amount of support being provided to process inserts and facilitate the formation of a threaded attachment between the insert and the container. Improving the degree of support bestowed to the process inserts allows for improved fluid monitoring and management using the instruments disposed in the inserts, in part, by improving the structural integrity of the inserts.

The process insert assemblies described herein comprise, consist, or consist essentially of a process insert and a support. The process insert has a shank and the support can be fully or partially disposed around the shank. In certain cases, the support is a threaded support having a threaded region configured to threadingly engage the threaded portion of the shank. The process insert can comprise, for example, and in some embodiments, any of the process inserts described hereinabove in Section I. However, any other type of process insert not inconsistent with the present disclosure can also be provided, so long as the support can threadingly engage and support the insert.

In some cases, the support is formed from a body of metallic material that can be disposed on or over a container. Non-metallic supports being formed from plastics, composites, or other materials are also contemplated. The supports can be discrete, standalone components or integrally formed with a container to which the insert will be connected. The support can, but does not have to, include a lower surface that is contoured to match the outer surface geometry of the container to which it will attach. For example, where the container is a pipe or vessel having a curved outer surface, the lower surface of the support can likewise have a contoured surface that matches or substantially matches the curvature of the container's outer surface.

Further, in some cases, the support comprises an annular shaped body having a bore extending through the center of the body. A portion of the bore forms an inner support surface that supports the shank. The inner support surface is machined or otherwise formed with an inner thread. The inner thread of the support matches the outer thread of the threaded portion of the shank, so that the two threaded surfaces can threadingly engage upon inserting the shank through the bore and rotating, screwing, or otherwise manipulating the insert so that the threaded shank threads with the threaded bore. The process insert and support can collectively form a process insert assembly, which can be supported on or over the exterior surface of a given container that contains a high velocity fluid.

The threaded portion of the process insert shank and the threaded region of the support are configured to engage to form a substantially non-locking threaded joint. That is, the threaded portion of the process insert shank and the threaded region of the support each comprise a machined thread that is substantially straight and non-tapered. Therefore, the non-locking threaded joint does not substantially seal the fluid inside the container, and some portion of the fluid may breach the joint and partially extend through a nozzle being attached to the support and/or insert. The fluid can be sealed in the container and nozzle via the flanged connection formed at the hub as described in Section I above.

For example, and in certain embodiments, an optional nozzle is provided and disposed between the insert and the support. The nozzle is configured to at least partially enclose the process insert shank and support one or more non-threaded portions of the shank. The nozzle can be partially nested in the bored portion of the support. Alternatively, the nozzle can abut the support and not substantially overlap the bore. The nozzle may be attached to the support and/or the process insert shank via welding, soldering, brazing, frictional engagement, threaded engagement, bonding, or any other type of joining process consistent with this disclosure.

One or more process assemblies can be connected to a container that comprises, consists, or consists essentially of an outer wall enclosing an interior volume. Each assembly includes a support configured to engage and support the process insert shank on or over the outer wall of the container. The support can directly contact the container or be spaced apart therefrom via one or more spacers, mats, seals, or grips. Containers incorporating such process insert assemblies can include pipes, ducts, vessels, tanks, conduits, or any other type of container enclosing a high velocity fluid.

The process insert assemblies described herein can have any combination of properties or features described herein not inconsistent with the objectives of the present disclosure. Numerous modifications and adaptations thereof will be readily apparent to those skilled in the art without departing from the scope of this disclosure.

III. Methods of Installing Process Inserts

In further aspects, methods of installing process inserts are disclosed. The process inserts and/or assemblies being installed on or over a container may include any of the inserts and assemblies described in Sections I and II above.

The method of installing a process insert to a container comprises inserting the free end of the insert in the interior volume of the container. The free end and portion of the insert being positioned inside the container forms the unsupported length, which corresponds to the portion of the shank that is distal from the hub and threaded portion. The remainder of the process insert can be supported outside of the container.

The installation method can further comprise, for example, rotating, threading, engaging, or screwing the threaded portion of the insert against or into the threaded region or portion of the container or the threaded region or portion of a support attached to the container. Screwing the threaded portion of the insert into the threaded portion of the container or support facilitates formation of a threaded engagement between the insert and the container and a threaded attachment between the insert and the container.

As noted above, the threaded portion of the support and the threaded portion of the process insert can comprise non-locking, machine threads. Thus, the threaded attachment does not form a substantially pressure containing and/or a pressure rated seal between the interior volume of the container and the exterior of the container. The fluid can be sealed in the container via a flanged connection or seal positioned at the process insert hub.

The installation method can further comprise forming a flanged connection between the insert and the container proximate to the hub or with the hub of the process insert. In some instances, forming the flanged connection can comprise inserting the process insert through a first flange member, inserting a second flange member over the insert, and seating the second flange member insert over the hub. In other instances, forming the flanged connection can comprise inserting the process insert through a first flange member and seating the first flange member directly or indirectly against an integral flange formed by the hub. The first flange member and integral flange are then joined via one or more fasteners and tightened together. Notably, the flange members or flange member and integral flange can form a pressure rated seal at the hub that complies with ANSI standards, where desired, between the interior volume of the container and the exterior of the container. Non-pressure rated seals are also contemplated, for lower pressure and/or lower temperature applications that fall outside of the ANSI standards.

The installation method can comprise threading the insert directly to the container, for example, in cases where the container has a threaded opening, or alternatively, threading the insert directly to the support being positioned over the container surface. The support can be attached or joined to the container via welding, soldering, brazing, bonding, threaded engagement, or any other type of joining process consistent with the present disclosure.

Further, and in some cases, the method of installing the process insert to the container further comprises inserting an instrument into the cavity of the insert. Such instrument can comprise, for example and without limitation, a probe, a sensor, a temperature sensor, a sampling attachment instrument, or an injection attachment device.

The methods described herein can have any combination of components or steps described herein not inconsistent with the objectives of this disclosure. Numerous modifications and adaptations thereof will be readily apparent to those skilled in the art without departing from the scope of this disclosure.

IV. Methods of Using Process Inserts

In further aspects, methods of using process inserts and assemblies are disclosed. In one embodiment, a method of measuring the temperature of a fluid flowing through a container is disclosed. The method can comprise inserting the free end of a process insert in the interior volume of the container. The process insert being inserted in the container may be any of the inserts described in Section I above. In certain embodiments, for example, where the temperature of the fluid is measured, the process insert comprises a thermowell. The thermowell can be inserted in a container such as a pipe, duct, vessel, conduit, or tank. The thermowell can have an overall structure that complies with the ASME PTC 19.3 TW standard, or the thermowell may fall outside of the ASME PTC 19.3 TW standard.

The method of measuring the temperature of a fluid flowing through the container can further comprise inserting a temperature sensor into the cavity of the insert and measuring the temperature of the fluid using the temperature sensor. The temperature sensor may include, without limitation, a RTD, bimetal Gauge, or thermometer, such as a gas actuated thermometer. Any other type of temperature sensor not inconsistent with the present disclosure is also contemplated.

According to a further embodiment, a method of sampling a fluid flowing through a container is disclosed. The method comprises inserting the free end of the process insert into the interior volume of the container. In this embodiment, for example, where the fluid is being sampled, the insert comprises a sampling probe. The method can further comprise extracting a fluid sample from the interior volume of the container through the cavity of the insert.

According to yet a further embodiment, a method of injecting a material into a fluid flowing through a container is disclosed. The method comprises insert the free end of the process insert into the interior volume of the container. In this embodiment, for example, where the fluid is being injected, the process insert is an injection quill. The method can further comprise injecting the material into the fluid flowing through the container through the cavity of the insert. The material being injected may include, without limitation, a liquid, a gas, a corrosion inhibiting material, or any other material not inconsistent with the present disclosure.

The methods described herein can have any combination of components or steps described herein not inconsistent with the objectives of the present disclosure. Numerous modifications and adaptations thereof will be readily apparent to those skilled in the art without departing from the scope of this disclosure.

Example 1

Process Inserts

Figure 1A:
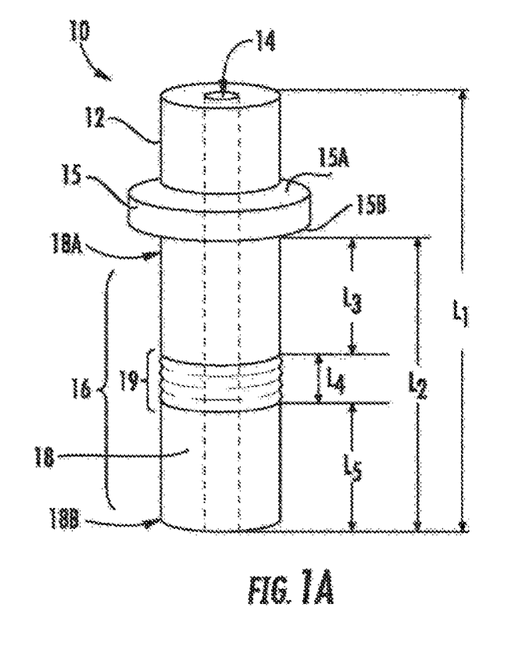
FIGS. 1A-1D schematically illustrates process inserts according to embodiments described herein.

FIGS. 1A-1D illustrate various aspects relating to process inserts according to the present disclosure. FIG. 1A schematically illustrates a first process insert 10. The process insert 10 comprises a head 12 having a cavity 14 formed therein. The process insert 10 further comprises a hub 15 disposed between the head 12 and a shank 16. The hub 15 can have a larger diameter than the head 12 and the shank 16 for supporting and/or engaging one or more flange members (e.g., 90A, 90B, FIG. 3A). The hub 15 can overlap at least one of the flange members (not shown) to form a lapped joint with the overlapped flange member. In some cases, the hub 15 can, but does not have to, overlap each of the flange members for forming a lapped joint with each flange member. The hub 15 is configured to form and/or support the formation of a pressure containing seal via the flanged connection or other pressure containing clamp style arrangement, which is optionally a pressure rated seal. For example, and in some cases, first and second flange members are seated on or over a respective first face 15A and a second face 15B of the hub 15.

The process insert shank 16 is elongated and comprises a first end 18A and a free end 18B opposite the first end. The first end 18A can be positioned directly or indirectly adjacent to each of the head 12 and/or the hub 15. Similarly, the hub 15 can surround portions of the head 12 and/or shank 16. The shank 16 can comprise one or more non-threaded portions and one or more threaded portions. For example, a threaded portion 19 of the shank can be disposed between the first and free ends 18A and 18B. The threaded portion 19 defines a threaded support surface by which the insert 10 can be supported on or over a container of high velocity fluid. The threaded portion 19 can be spaced apart from each of the first end 18A and the second end 18B, by at least about 0.2 inches or more, at least 0.25 inches or more, at least 0.5 inches or more, or more than 0.5 inches.

The cavity 14 can extend through portions of the head 12 and the shank 16. The cavity 14 is shown in broken lines for illustration purposes only, as the cavity 14 can extend internally within the insert to any desired length. For example, and in some embodiments, the cavity 14 only partially extends through the shank 16. In other embodiments, the cavity 14 fully extends through the shank 19 and has openings at the head 12 and the free end 16B of the shank.

The process insert 10 can comprise an overall length L1. The overall length L1 can comprise any length consistent with the present disclosure. For example, exemplary overall length dimensions are provided in Table 1 above, in Section I.

The process insert 10 further comprises an overall shank length L2. The overall shank length L2 extends in a longitudinal direction and can comprise any length not inconsistent with the instant disclosure. For example, the overall shank length L2 can comprise a length of between about 1 inches and 46 inches, or any subrange thereof (e.g., 1-6 in., 2-24 in., 4-8 in., etc.).

The process insert 10 can further comprise a supported length and an unsupported length. Exemplary dimensions for the unsupported length of the insert are provided in Table 2 above. In some cases, the supported length of the insert 10 consists of a first length L3 disposed between the threaded portion 19 and the hub 15 summed with a second length L4, corresponding to a length of the threaded portion 19.

The unsupported length L5 is the length of the shank 16 being positioned below the threaded portion 19, and is most distal from the hub. In some embodiments, the supported length (L3+L4) is greater than the unsupported length L5. In other embodiments, the supported length (L3+L4) is less than the unsupported length L5. A ratio of the supported length (L3+L4) to the unsupported length L5 can be greater than 1 in some embodiments, which is advantageous, as a reduced unsupported length L5 can improve the mechanical stability of the process insert 10 when the insert 10 is positioned in a high velocity fluid stream. In FIG. 1A, the threaded portion 19 is illustrated as being substantially centrally disposed between the first end 18A and the free end 18B. However, the threaded portion 19 could be disposed closer to either the first or free end, depending on the fluid monitoring application.

Figure 1B:
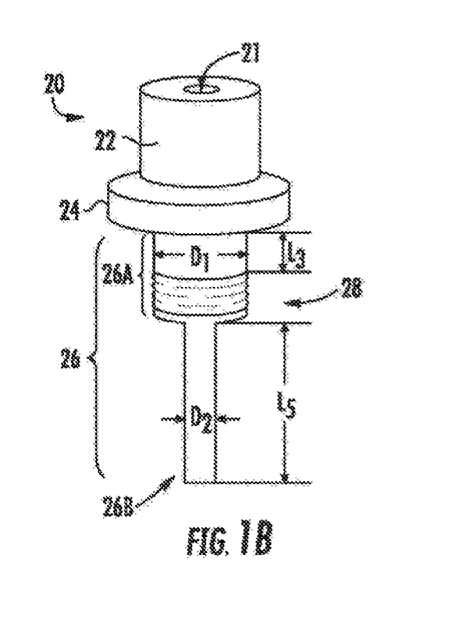

FIG. 1B is a further embodiment of a process insert 20. The process insert 20 comprises a head 22 having a cavity 21 formed therein, a hub 24, and a shank 26. The shank 26 comprises a first body portion 26A and a second body portion 26B. The first body portion 26A can be shorter than the second body portion 26B such that the threaded portion 28 is located closer to the first end than the free end.

As FIG. 1B further illustrates, the first body portion 26A comprises a first diameter D1 and the second body portion 26B comprises a second diameter D2. The overall shank 26 comprises a stepped body having a step between the first body portion 26A and the second body portion 26B. The first and second body portion 26A and 26B may also comprise a stepped configuration within that body portion, for example, second body portion 26B may include a larger diameter portion and a smaller diameter portion, where desired.

In certain embodiments, the first diameter D1 is greater than the second diameter D2. The second body portion 26B can be substantially uniform and straight (i e., non-tapered) as depicted in FIG. 1B, or the second body portion 26B can be tapered as depicted in FIG. 1D or stepped as noted above. The threaded portion 28 can be disposed over less than one-half of the shank or more than one-half of the shank. As noted above, the threaded portion 28 can be disposed over any location or occupy any portion of the shank not inconsistent with the present disclosure.

Figure 1C:
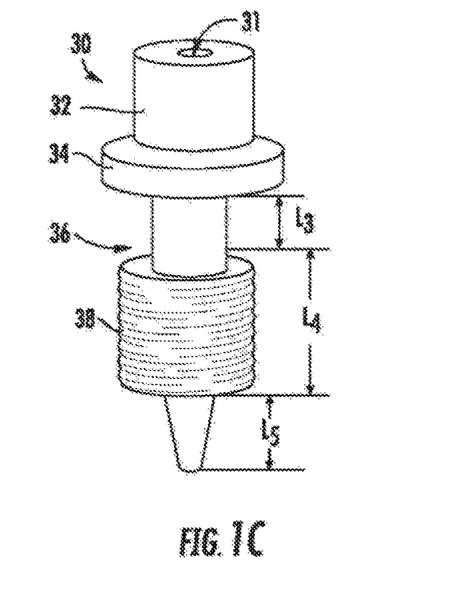
Figure 1D:
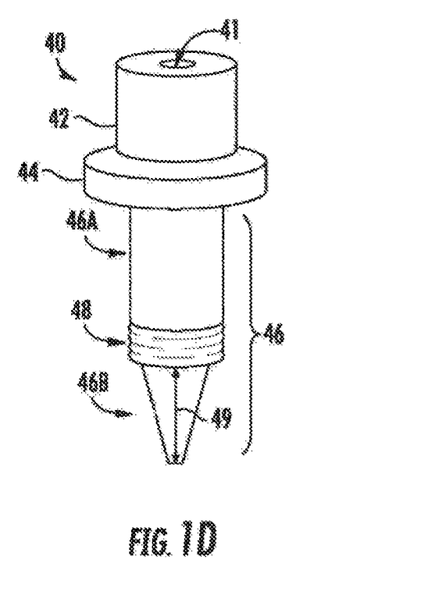

FIG. 1C is a further embodiment of a process insert 30 comprising a head 32 with a cavity 31, a hub 34, and a shank 36. In this embodiment, the threaded portion 38 of the shank has a greater diameter than each of the non-threaded portions of the shank. The unsupported length on the free end side of the shank 36 is also tapered, and non-uniform. Tapering the end of the shank may be desired for allow for more accurate temperature readings, in certain cases. As FIG. 1C illustrates, the threaded portion 38 of the shank 36 can occupy more than one-half of the shank body, in certain embodiments.

FIG. 1D illustrates a further embodiment of a process insert, generally designated 40. The insert 40 comprises a head 42 having a cavity 41 formed therein, a hub 44, and a shank 46. The shank comprises a first end 46A proximate to the hub 44 and a free end 46B. A threaded portion 48 is disposed between the first and free ends. In this embodiment, the thread occupies less than one-half of the shank body. Further, in this embodiment, the threaded portion 48 is located closer to the free end 48B than the first end 48A. The unsupported length 49 of the shank is also tapered in this embodiment, although, as FIG. 1B illustrates, the unsupported length 49 can also be non-tapered.

The inserts illustrated in FIGS. 1A-ID can have any combination of features of components as described in Section I above, and are not limited to the exemplary embodiments being shown. Numerous modifications and adaptations thereof will be readily apparent to those skilled in the art without departing from the scope of the present subject matter.

Example 2

Process Insert Assemblies

Figures 2A, 2B, 2C:
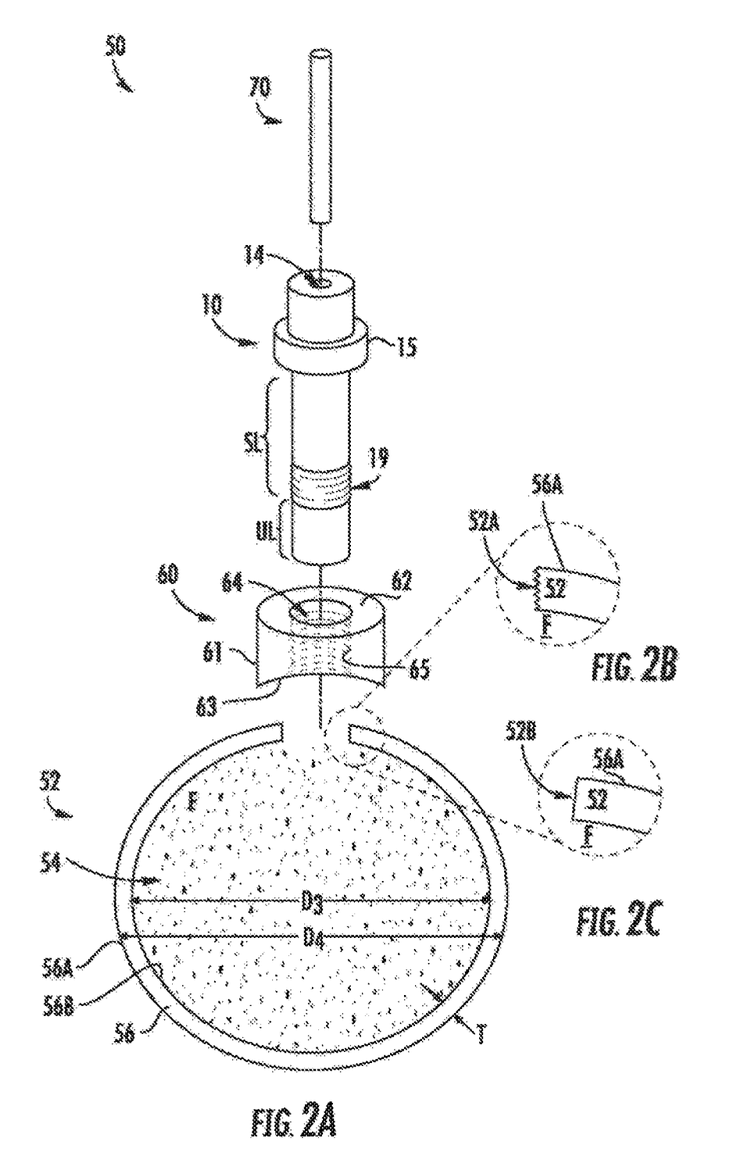
FIG. 2A schematically illustrates a process insert assembly according to an embodiment described herein.
FIGS. 2B and 2C are detail views of an opening in a high velocity fluid-containing container according embodiments described herein.

FIGS. 2A-2C schematically illustrate various aspects relating to process insert assemblies as described herein. FIG. 2A is an exploded view illustrating a process insert system, generally designated 50, which includes a process insert assembly and a container. The process insert assembly comprises or consists of a process insert 10 and a support 60. The assembly can attach to a container 52 having an interior volume 54 defined by or between one or more structures, surfaces, or walls 56 of the container. A fluid F is disposed in the container, and can pass through the container at a high velocity, in certain instances. The fluid F can comprise a high velocity liquid or gas contained in the container 52, and the container 52 can comprise an inner diameter D3 and an outer diameter D4. The container thickness T can comprise any suitable dimension not inconsistent with the present disclosure, and in certain embodiments, is between about 0.5 and 18 inches. Other container thicknesses T, even variable thicknesses T, are contemplated.

As FIG. 2B illustrates, the container 52 may comprise a threaded opening 52A. In this embodiment, the threaded portion 19 of the insert 10 can thread directly to the container for directly supporting the insert. Thus, in certain embodiments, the support 60 is optional and may not be provided.

As FIG. 2C illustrates, however, the container 52 may comprise a non-threaded opening 52B. In this embodiment, the process insert 60 can be provided on or over the container 52 for directly supporting the insert 10. The process insert 60 can be welded to the container in certain embodiments.

Referring back to FIG. 2A, an instrument 70 can be inserted and positioned within the cavity 14 of the insert 10. The instrument 70 can comprise a probe or a sensor configured to interact with the fluid F in the container 52. In some cases, the instrument 70 is used to attach a probe or a sensor to the insert 10 and container. In other cases, the instrument is a probe used to extract or inject the fluid F. In further cases, the instrument 70 is a sensor used to measure a temperature, pressure, or other attribute associated with the fluid F.

During installation of the insert 10 to the container 52, the insert can be positioned through an opening in the container 52 and optionally through the support 60, if provided. The threaded portion 19 of the insert can be rotated, screwed, and/or otherwise threaded against the threaded opening 52A of the container 54 or a threaded region 65 of the support for forming a threaded attachment between the insert 10 and the container 60. As described in Section I above, the threaded attachment between the insert 10 and the container 60 and/or the insert 10 and the support 60 improves the amount of support being imparted to the insert 10, and may not necessarily used to seal the fluid F in the container.

The support 60, where used, includes a body 61 having an upper surface 62 and a lower surface 63. The lower surface 63 can be contoured, as needed, to match the contour of the container 52. A cavity or bore 64 is formed through the support, and has openings at the upper and lower surfaces 62 and 62. At least a portion of the bore 64 forms the threaded region 65 that matches the threaded portion 19 of the insert. The insert 10 can be inserted and threaded directly to the support 60, which provides an additional point of support for the insert 10 outside of the container 52 wall.

As FIG. 2A further illustrates, the unsupported length UL of the insert 10 will be positioned through the support 60 and opening of the container 52 so that it is positioned in the stream of the flowing fluid F. The remainder of the insert, or the supported length SL, is disposed and/or supported outside of the container 52 via the support 60 and optional nozzle (e.g., 120, FIG. 3A). The threaded portion 19 can provide a discrete point of support at the container outer surface or wall 52, which allows the unsupported length UL of the insert to be reduced and strengthen the ability of the insert 10 to withstand velocity induced vibration.

Figure 3A:
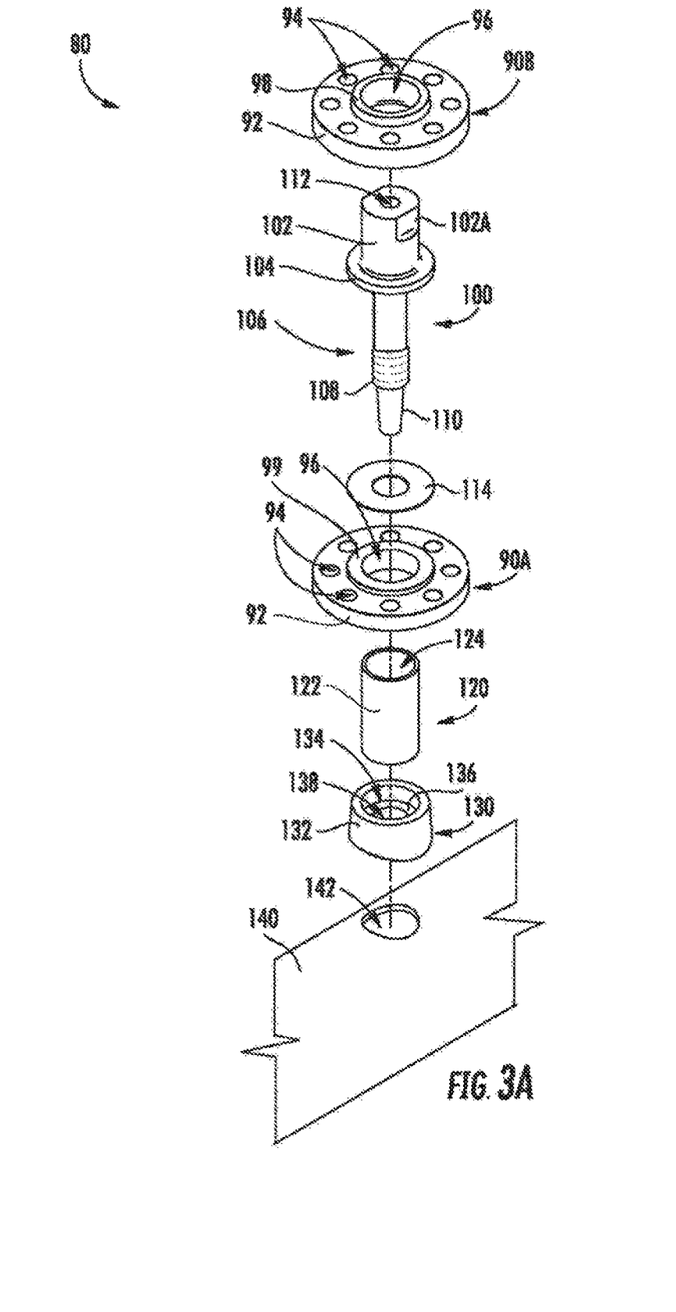
FIGS. 3A and 3B are exploded perspective and side views of a process insert assembly according to an embodiment described herein.
Figure 3B:
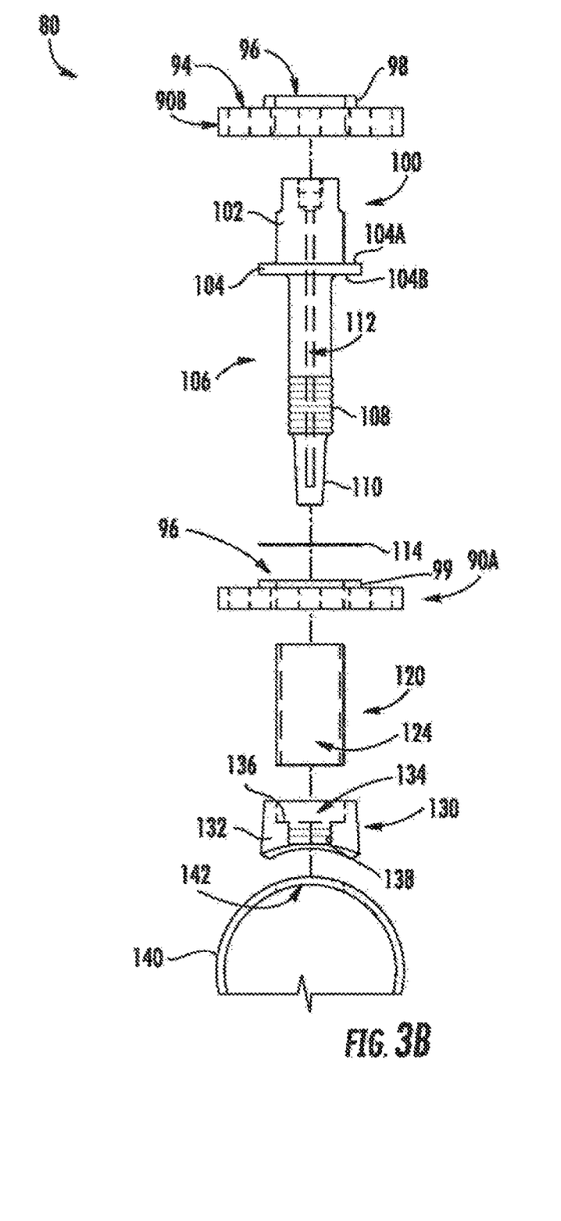
Figure 3C:
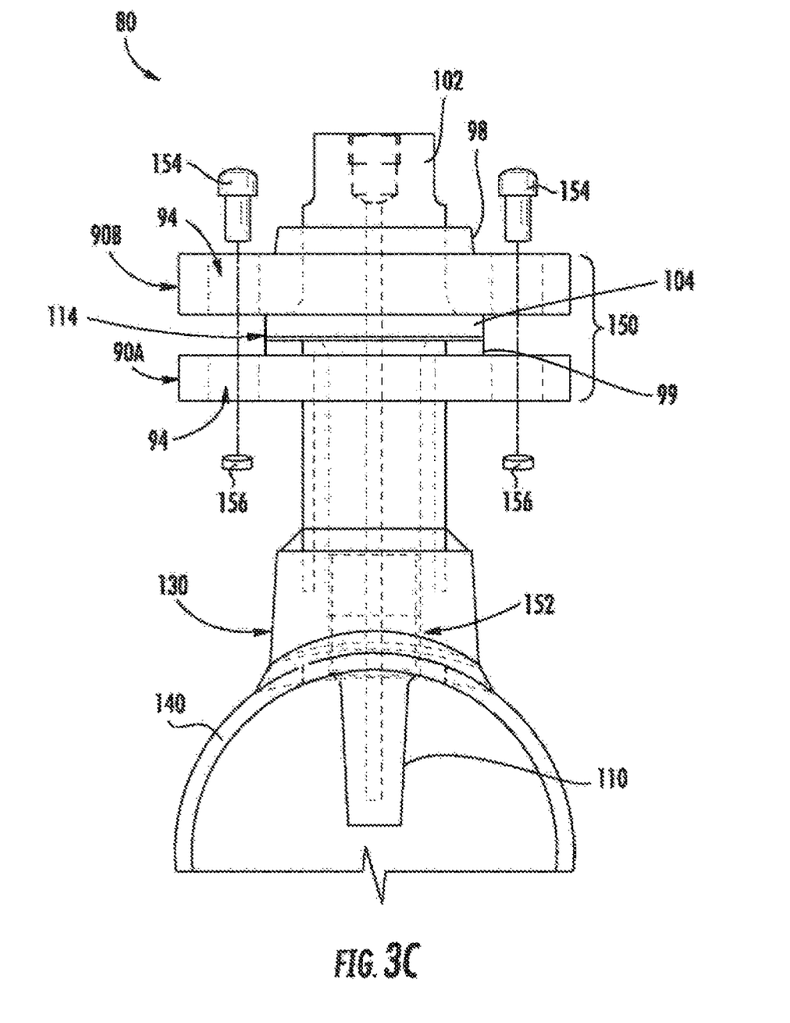
FIG. 3C is a side view of a process insert assembly according to an embodiment described herein.

FIGS. 3A-3C are schematic views of a process insert system, generally designated 80, which includes a process insert assembly and a container. Referring to FIGS. 3A-3C collectively, the system 80 comprises an insert 100 and a support 130, which together form a process insert assembly.

The process insert 100 can be installed to the container via inserting the insert 100 through an optional spacer 114, first flange member 90A, nozzle 120, support 130, and the container 140, and then rotated to form a threaded attachment on, over, or within the container 140. In this exemplary embodiment, the container 140 is a pipe. A second flange member 90B can be provided over the process insert 110. The first and second flange members 90A and 90B can be seated on, over, or against the hub 104 of the insert 100, and tightened together to form a flanged connection via one or more fasteners.

The process insert 100 comprises a head 102 having a cavity 112, a hub 104, and a shank 106. The shank includes a threaded portion 108 that matingly engages the support 130 and/or the container 140. The head 102 of the process insert is formed with a shaped region 102A, by which a tool (e.g., wrench, pliers, etc.) can grip the insert 100 for manipulating and screwing it into the support 130 or container 140. Once installed, as seen in FIG. 3C, the unsupported length 110 of the shank is positioned inside of the container 140, directly in the stream of a fluid flowing through the container. The remainder of the shaft is disposed outside of the container 140, and proximate to the outer wall of the container.

Referring to the respective first and second flange members 90A and 90B illustrated in FIGS. 3A-3C, each member comprises a body 92 having a primary aperture 96 and one or more fastener receiving holes 94 formed therethrough. The fastener receiving holes 94 are configured to receive one or more fastening members (e.g., bolts, 154, FIG. 3C), which can be tightened against the flanged members for forcing the flanged members together and forming a flanged connection to seal the fluid in the container 140. The primary aperture 96 can comprise a centrally disposed aperture though which portions of the insert 100 extend. Each of the respective first and second flange members 90A and 90B can optionally comprise Van Stone flange members, where one is a receiving Van Stone flange and one is a lapping Van Stone flange. Each of the respective first and second flange members 90A and 90B can alternatively be a raised face flange, flat face flange, ring joint flange, or a tongue and groove flange. Pressure containing clamp style seals are also contemplated.

As FIG. 3C illustrates, the hub 104 forms a lapped joint with the first flange member 90A. The first flange member 90A comprises a lapping area 99 that abuts the hub 104 directly or indirectly. A spacer 114, such as a gasket, washer, or plate, can optionally be disposed between the hub 104 and lapping member 99. The hub 104 can also form a lapped joint with the second flange member 90B, in certain embodiments. The second flange member 90B comprises a stepped area 98 that receives and retains the head 102 of the insert 100.

Referring in general to FIGS. 3A-3C, a nozzle 120 can be provided over or around portions of the insert 100 and shaft 106. During installation or replacement of the insert, a minimal amount of fluid may breach the container 140 and be retained by the nozzle 120. The nozzle 120 includes an outer surface or wall 122 that defines an aperture 124 for receiving the insert 100. The nozzle 120 can be partially received or nested within a portion of the support 130 at a support facing end. Alternatively, the nozzle 120 may abut the support 130 in an end-to-end configuration. The nozzle 120 and support 130 can be joined via any suitable method not inconsistent with the instant disclosure, such as being welded, threaded, or adhesively bonded together.

Still referring to FIGS. 3A-3C, the support 130 can comprise a body 132 defining a central bore 134. In some cases, the bore is uniform. In other cases, as illustrated in FIG. 3B, the bore has a stepped structure including a planar face 136 over which the nozzle is seated and an inner surface 138 provided orthogonal to the face 136. The inner surface 138 is threaded and threadingly engages the process insert 100

FIG. 3C is a side view of the system 80, which depicts sectional portions in broken lines. As FIG. 3C shows, the insert 100 is inserted into the container 140 and screwed into the support 130 to form a threaded attachment 152. The threaded attachment may create a seal having minimal pressure; however, as the seal is non-locking, the seal may be non-rated. The support 130 can anchor the insert 100 to the container 140 enabling it to better resist vibration induced damage.

Moreover, the support 130 and nozzle 120 each support the insert 100, for example, non-threaded portions of the insert, outside of the container 140. The unsupported length 110 of the insert 100 is inserted within the container 140. Bolts 154 are secured and tightened together via one or more retaining structures, such as nuts 156, to form the flanged connection 150. The flanged connection 150 is spaced apart from the outer surface of the container 140, and creates a pressure containing seal between the inside of the container and the outside of the container. The seal can be a pressure rated seal meeting ANSI standards, in some embodiments.

Figure 4A:
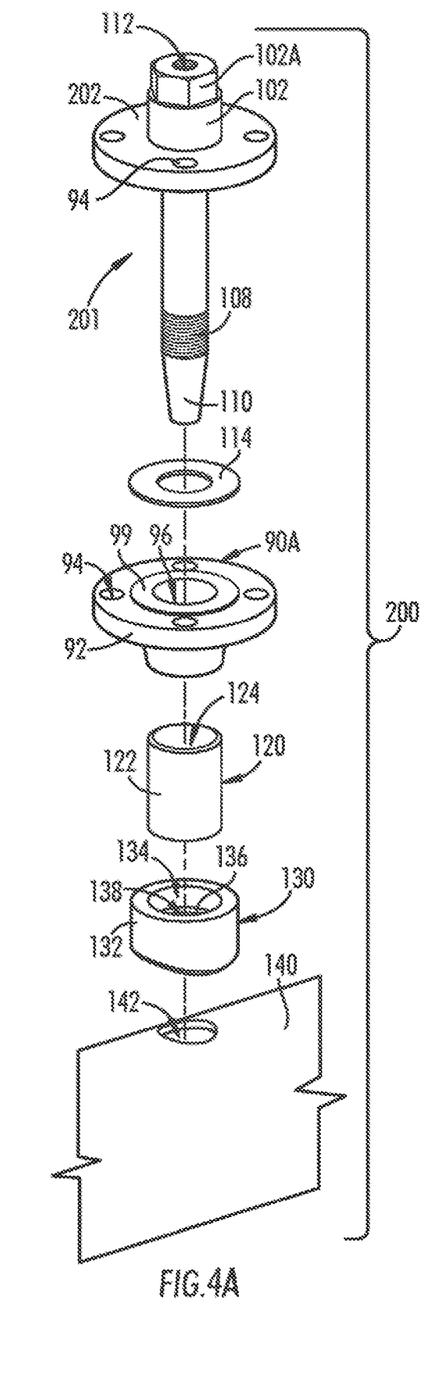
FIGS. 4A and 4B are exploded perspective and side views of a process insert assembly according to an embodiment described herein.
Figure 4B:
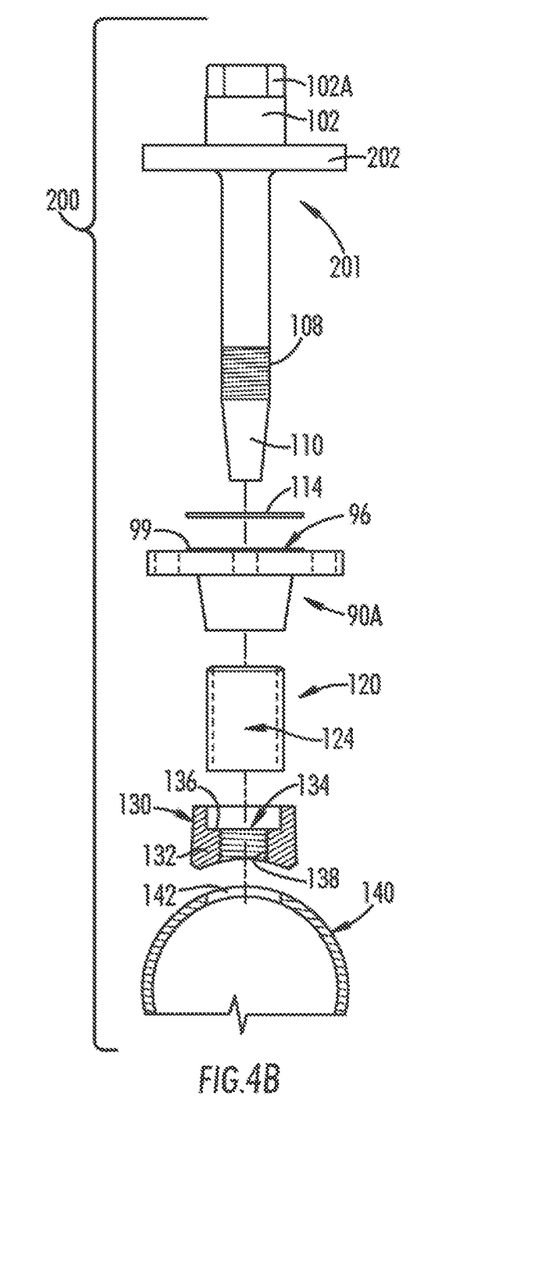

FIGS. 4A and 4B describe an embodiment of a process insert system 200, which includes a process insert assembly and a container (such as a pipe). Many of the features shown in FIGS. 4A and 4B are features commonly shared across the various embodiments described herein, such as in the embodiments shown in FIGS. 1A-3C, where common features are designated by the same reference numbers and described with the same terms across all embodiments. For purposes of brevity, discussions of these common features have been omitted with respect to FIGS. 4A and 4B, and the previous passages herein describing those features are incorporated by reference with respect to FIGS. 4A and 4B.

Referring to FIGS. 4A and 4B collectively, the process insert system 200 comprises an insert 201 and a support 130, which together form a process insert assembly. The process insert 201 can be installed to the container via inserting the insert 201 through an optional spacer 114, first flange member 90A, nozzle 120, support 130, and the container 140, and then rotated to form a threaded attachment on, over, or within the container 140. In this exemplary embodiment, the container 140 is a pipe. The hub is an integral flange 202 configured to be tightened together with the first flange member 90A to form a flanged connection (see FIG. 3C for an exemplary connection).

The integral flange 202 is positioned between the shank 106 and the head 102, and radially extends outward from a surface of the process insert 201. The integral flange 202 can be integrally formed from the process insert 201, or can be a separate flange piece that has been attached to the process insert 201 through welding, soldering, brazing, frictional engagement, threaded engagement, bonding, or any other type of joining process consistent with this disclosure. A plurality of fastener receiving holes 94 are distributed radially, proximate to an outer circumferential edge of the integral flange 202, and extend through the integral flange 202. The fastener receiving holes 94 are configured to receive one or more fasteners (e.g., bolts, 154, FIG. 3C), which can be tightened against the first flanged member 90A and the integral flange 202, applying a compressive force that pushes the first flanged member 90A and the integral flange 202 together, forming a flanged connection to seal the fluid in the container 140. The first flange member 90A can optionally be a Van Stone-type flange. In some instances, the first flange member 90A can be a raised face flange, flat face flange, ring joint flange, or a tongue and groove flange. In some preferred embodiments, the first flange member 90A is a raised face flange. Pressure containing clamp style seals are also contemplated.

In instances where the first flange member 90A is a Van Stone-type flange, the nozzle 120 can have a first end (e.g., the end facing the integral flange 202, opposite a support facing end) that is rolled, bent, or turned outward to form a Van Stone-style face flange commonly known to the skilled artisan for Van Stone-style flange connections. This face flange is positioned (e.g., sandwiched) between the first flange member 90A and the integral flange 202 to form a seal therebetween. In some instances, the face flange can be a separate component welded or otherwise bonded to the first end of the nozzle 120.

When the first flange member 90A is a raised face flange, flat face flange, ring joint flange, or a tongue and groove flange, the first flange member 90A can be attached to the first end of the nozzle 120 through welding, soldering, brazing, frictional engagement, threaded engagement, bonding, or any other type of joining process consistent with this disclosure.

The inserts and assemblies illustrated in FIGS. 1A-4B can have any combination of features or components as described in Sections I and II above, and are not limited to the exemplary embodiments being shown. It is particularly to be noted that inserts and assemblies described herein can include any combination of features or components recited in the following claims, in any combination, whether said claims are presented in multiple dependent form or not. All such intermediate embodiments are expressly contemplated herein.

The invention claimed is:

1. A process insert comprising:
    a head comprising a cavity configured to receive an instrument;
    a shank comprising an elongated body having a first end disposed proximate to the head, a free end opposite the first end, and a non-locking threaded portion spaced apart from each of the first and free ends, wherein the cavity extends through a portion of the elongated body;
    a support disposed around portions of the shank, wherein the support comprises a non-locking threaded region configured to threadingly engage the shank, wherein threading the shank and the support does not form a pressure containing seal or a pressure rated seal; and
    a hub configured to form a pressure containing seal between a container and the insert when the insert is coupled to the container.

2. The insert of claim 1, wherein the hub is an integral flange.

3. The insert of claim 2, wherein the integral flange is positioned between the head and the shank.

4. The insert of claim 2, wherein the integral flange is a raised face flange, flat faced flange, ring joint flange, or a tongue and groove flange.

5. The insert of claim 2, wherein the integral flange is welded, soldered, or brazed to the process insert.

6. The insert of claim 2, wherein the integral flange is formed from the same material as the process insert and has a unitary structure with the process insert.

7. The insert of claim 2, further comprising a first flange member disposed on a shank facing side of the integral flange.

8. The insert of claim 7, wherein the first flange member is a Van Stone flange, raised face flange, flat face flange, ring joint flange, or a tongue and groove flange.

9. The insert of claim 7, further comprising a plurality of bolts disposed through the first flange member and the integral flange for forming a pressure containing seal.

10. The insert of claim 1, wherein the hub is positioned between the head and the shank and extends radially outward, the hub being configured to form a lapped joint.

11. The insert of claim 10, further comprising:
    a first flange member disposed on a shank facing side of the hub, and
    a second flange member disposed on a head facing side of the hub.

12. The insert of claim 11, wherein the first flange member or the second flange member is a Van Stone flange, raised face flange, flat face flange, ring joint flange, or a tongue and groove flange.

13. The insert of claim 1, wherein the threaded portion is located closer to the free end than the first end.

14. The insert of claim 1, wherein approximately one-half of the elongated body is disposed on a first side of the threaded portion.

15. The insert of claim 14, wherein approximately one-quarter of the elongated body is disposed on a second side of the threaded portion.

16. The insert of claim 1, wherein the threaded portion is disposed on less than one-half of the shank.

17. The insert of claim 1, wherein the cavity extends only partially through the shank in the elongated direction.

18. The insert of claim 1, further comprising an instrument disposed in the cavity.

19. The insert of claim 1, wherein the instrument is a thermocouple, a resistance temperature detector (RTD), a bimetal Gauge, a thermometer, or a gas actuated thermometer.

20. The insert of claim 1, wherein the insert is a thermowell.

21. The insert of claim 1, wherein the cavity extends completely through the shank in the elongated direction.

* * * * *